United States Patent
Nomiyama et al.

(10) Patent No.: US 9,971,360 B2
(45) Date of Patent: May 15, 2018

(54) POSITIONER

(71) Applicant: Azbil Corporation, Tokyo (JP)

(72) Inventors: Takashi Nomiyama, Tokyo (JP); Keisuke Narumi, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 399 days.

(21) Appl. No.: 14/642,084

(22) Filed: Mar. 9, 2015

(65) Prior Publication Data

US 2015/0261226 A1    Sep. 17, 2015

(30) Foreign Application Priority Data

Mar. 11, 2014 (JP) ................. 2014-047726

(51) Int. Cl.
| | |
|---|---|
| *G05D 7/06* | (2006.01) |
| *F15B 5/00* | (2006.01) |
| *F15B 19/00* | (2006.01) |
| *G05B 11/01* | (2006.01) |
| *G05B 15/02* | (2006.01) |

(52) U.S. Cl.
CPC ........... *G05D 7/0676* (2013.01); *F15B 5/006* (2013.01); *F15B 19/002* (2013.01); *G05B 11/01* (2013.01); *G05B 15/02* (2013.01)

(58) Field of Classification Search
CPC ...... G05D 7/0676; G05B 11/01; G05B 15/02; F15B 19/002; F15B 5/006
See application file for complete search history.

(56) References Cited

U.S. PATENT DOCUMENTS

| | | | | |
|---|---|---|---|---|
| 5,931,180 A | * | 8/1999 | Nagasaka | G05B 19/19 137/487.5 |
| 2011/0048556 A1 | | 3/2011 | Carter et al. | |
| 2013/0238137 A1 | | 9/2013 | Kashima et al. | |

FOREIGN PATENT DOCUMENTS

| | | |
|---|---|---|
| EP | 0921455 A2 | 6/1999 |
| JP | 3511458 | 3/2004 |

OTHER PUBLICATIONS

Extended European Search Report dated Aug. 11, 2015 issued in corresponding European Patent Application No. 15157948.9.

* cited by examiner

*Primary Examiner* — Carlos Ortiz Rodriguez
(74) *Attorney, Agent, or Firm* — Oblon, McClelland, Maier & Neustadt, L.L.P.

(57) ABSTRACT

In a positioner, a driving signal IM is set to IMMIN (the minimum), a valve opening position A after the valve has then settled is stored, the driving signal IM is set to IMMAX (the maximum), a valve opening position B after the valve has then settled is stored, and the valve opening positions up until the opening of the valve arrives at the valve opening position B from the valve opening position A are stored together with the elapsed times as time series position information J1, where, based on this stored time series position information J1, the time for the opening of the valve to traverse between two prescribed valve opening positions that are established in the interval between the valve opening position A and the valve opening position B is calculated as a first response time Tup.

6 Claims, 11 Drawing Sheets

POSITIONER

CROSS REFERENCE TO RELATED APPLICATION

This application claims priority under 35 U.S.C. § 119 to Japanese Patent Application No. 2014-047726, filed on Mar. 11, 2014, the entire content of which being hereby incorporated herein by reference.

FIELD OF TECHNOLOGY

The present disclosure relates to a positioner having an electropneumatic converting portion for converting an inputted electric signal into an air pressure for controlling a valve opening of a valve regulator through an operating device by applying, to the operating device of the valve regulator, the air pressure that has been converted.

BACKGROUND

Conventionally, in this type of positioner an automatic setup has been performed product, prior to actually controlling the valve opening of the regulator valve, after installation in the workplace (either new insulation or as a replacement), to adjust automatically the zeroing and the span, and to tune the control parameters. Note that the zero and span adjustment and the tuning of the control parameters is performed also during scheduled maintenance as well.

As part of this automatic setup, there is a procedure for executing full opening/closing strokes of the valve in order to tune the control parameters, where the average response time TRES, for the valve to traverse between the 10% position and the 90% position of the valve during the full opening/closing strokes of the valve is measured, to determine the size of the operating device from the average response time TRES, to determine the control parameters from the operating device size that has been determined and from the hysteresis level of the operating device. See, for example, Japanese Patent No. 3511458 ("the JP '458") Japanese Unexamined Patent Application Publication No H11-166655).

The conventional process for finding the average response time TRES will be explained using the flowchart presented in FIG. 9.

(1) The driving signal (the control input) IM when converting the inputted electric signal into an air pressure is set to IMMIN (the minimum) (Step S101). This causes the valve to move toward the fully closed position (the 0% position), as illustrated in FIG. 10. Note that while there is also a type wherein the valve moves towards the fully open position (the 100% position) when the driving signal IM is set to IMMIN, the explanation here will be for those that moved toward the fully closed position.

(2) Thereafter, upon detection that the movement of the valve has stopped and settled (YES in Step S102), the valve opening position A at that time is stored (Step S103).

(3) Following this, the driving signal IM is set to IMMAX (the maximum) (Step S104). Doing this causes the valve to move toward the fully open position (a full opening operation). (4) Thereafter, upon detection that the movement of the valve has stopped and settled (YES in Step S105), the valve opening position B at that time is stored (Step S106).

(5) Following this, the driving signal IM is set to IMMIN (Step S107). This causes the valve to move to the valve opening position A from the valve opening position B (a full closing operation).

(6) During this interval, the valve open position is monitored and the time is measured, to measure and store, as the first response time Tdown, the time for the opening of the valve to arrive at the 10% position, from the 90% position, of the interval between the valve opening positions A and B (Step S108).

(7) After arriving at the valve opening position A, the driving signal IM is set to IMMAX (Step S109). This causes the valve to move toward the valve opening position B from the valve opening position A (t full opening operation).

(8) During this interval, the valve open position is monitored and the time is measured, to measure and store, as the second response time Tup, the time for the opening of the valve to arrive at the 10% position, from the 90% position, of the interval between the valve opening positions A and B (Step S110).

(9) Following this, the average of the first response time Tdown, measured in Step S108, and the second response time Tup, measured in Step S110, is taken to calculate the average response time TRES (where TRES=(Tdown+Tup)/2) between the 10% position and the 90% position for the valve (Step S111).

Averaging, in this case, Tdown and Tup is because there are times wherein Tdown does not equal Tup. That is, sometimes there is a difference in the speeds in the operating device for the direction of increasing the valve opening and the direction of decreasing the valve opening, so that taking an average of the two enables better precision.

However, in the conventional procedure, set forth above, for finding the average response time TRES, operations for moving the valve all the way from end to end (full stroke operation cycles) are performed three times (in Steps (3), (5), and (7)), and thus there is a problem in that finding the average response time TRES is extremely time-consuming.

The majority of the time required in the automatic setup of the positioner as a whole is occupied by the full stroke operation cycles for the valve, so a reduction in the number of full stroke operation cycles reduces the amount of time required in the automatic setup.

Note that when, in Step (1) the driving signal IM is set to IMMAX, the process diagram that shows the change in the valve opening position for the valve illustrated in FIG. 10 can be replaced by a process diagram as illustrated in FIG. 11. FIG. 7, shown in the JP '458, is no more than that which is shown beginning with Step (5) in the process diagram presented in FIG. 11. That is, the operation in FIG. 7, illustrated in the JP '458, assumes that the valve opening positions A and B for the valve have been found prior to entering into this operation.

The present invention is to solve such a problem, and an aspect thereof is to provide a positioner wherein the time required for the automatic setup can be reduced.

SUMMARY

The present invention, in order to achieve such an aspect, is a positioner having an electropneumatic converting portion for converting an inputted electric signal to an air pressure, to apply the converted air pressure to an operating device of a regulator valve, to control a valve opening of the regulator valve through the operating device. The positioner includes: a first valve opening position storing portion that stores, as a first valve opening position, a valve opening position for when an input electric signal has been set so that a driving signal, which when converted into an air pressure, is set to one of either a minimum signal or a maximum signal, and the regulator valve has then settled; a first time series position information storing portion that stores, after the first valve opening position has been stored, as a second valve opening position, a valve opening position for when an input electric signal has been set so that a driving signal, which when converted into an air pressure, is set to other of either a minimum signal or a maximum signal, and the regulator valve has then settled, and stores, as time series position information, the valve opening positions, along with the elapsed times, up until the valve opening of the regulator valve arrives at the second valve opening position from the first valve opening position; and a first response time calculating portion that calculates, as a first response time, the time over which the valve opening of the regulator valve passes between two prescribed valve opening positions, established in an interval between the first valve opening position and the second valve opening position, based on the time series position information stored by the first time series position information storing portion.

In the present invention, the driving signal is set to a minimum signal, when the inputted electric signal is converted to an air pressure, and the opening position of the when the regulator valve has settled thereafter is stored as a first valve opening position, after which the driving signal is set to a maximum signal and the opening position of the when the regulator valve has settled thereafter is stored as a second valve opening position and, additionally, the valve opening positions up until the opening of the valve arrives at the second valve opening position from the first valve opening position are stored together with the elapsed times as time series position information, and the time for the opening of the regulator valve to traverse between the specific valve opening positions established in the interval between the first valve opening position and the second valve opening position is found, as a first response time, based on the explanation that has been stored. Through this, the present invention enables the first full stroke operation to be used effectively to find the first response time in this first full stroke operation, making it possible to shorten the time required for finding the average response time TRES.

For example, as a first method, after storing the second valve opening position, driving signal is set to the minimum signal and, thereafter, the time for the opening of the regulator valve to traverse between specific valve opening positions established in the interval between the first valve opening position and the second valve opening position is measured, as a second response time, and the average of the first response time, found in the first full stroke operation, and the second response time, measured in this full stroke operation, is calculated as an average response time TRES. This enables the average response time TRES to be calculated through two full stroke operation cycles.

For example, as a second method, after storing the second valve opening position, driving signal is set to the minimum signal, and the valve opening positions up until the opening of the valve arrives at the first valve opening position from the second valve opening position are stored together with the elapsed times as time series position information, where the time for the opening of the regulator valve to traverse between specific valve opening positions established in the interval between the first valve opening position and the second valve opening position is found, as a second response time, based on this time series information that has been stored, and the average of the first response time, found in the first full stroke operation, and the second response time, measured in this full stroke operation, is calculated as an average response time TRES. This enables the average response time TRES to be calculated through two full stroke operation cycles.

In the present invention, the driving signal is set to a minimum signal, when the inputted electric signal is converted to an air pressure, and the opening position of the when the regulator valve has settled thereafter is stored as a first valve opening position, after which the driving signal is set to a maximum signal and the opening position of the when the regulator valve has settled thereafter is stored as a second valve opening position and, additionally, the valve opening positions up until the opening of the valve arrives at the second valve opening position from the first valve opening position are stored together with the elapsed times as time series position information, and the time for the opening of the regulator valve to traverse between the specific valve opening positions established in the interval between the first valve opening position and the second valve opening position is found, as a first response time, based on the time series information that has been stored, thus enabling the first full stroke operation to be used effectively to find the first response time, making it possible to shorten the time required for finding the average response time TRES, enabling shortening of the time required for the automatic setup.

BRIEF DESCRIPTIONS OF THE DRAWINGS

DETAILED DESCRIPTION

Figure 1:
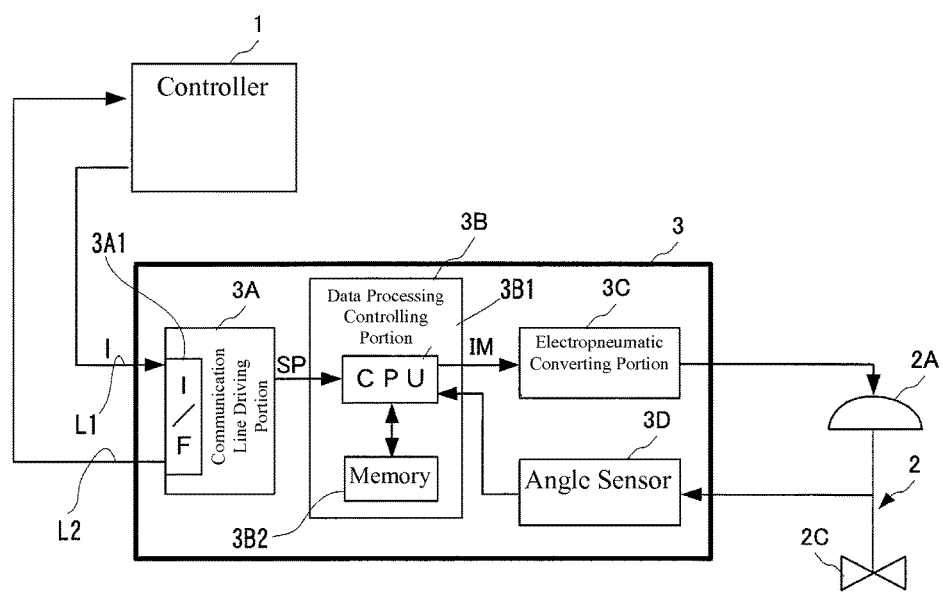
FIG. 1 is a system structural diagram for a regulator valve control system that uses a positioner according to the present invention.

Examples according to the present disclosure will be explained below in detail, based on the drawings. FIG. 1 is a system structural diagram for a regulator valve control system that uses a positioner according to the present invention.

In FIG. 1, 1 is a controller, 2 is a regulator valve (valve), 3 is a positioner according to the present invention for controlling the opening of the valve 2, and L1 and L2 are communication lines for connecting between the controller 1 and the positioner 3. A 4-20 mA input current I is applied, as setting value data, to the positioner 3 by the controller 1 through these communication lines L1 and L2.

The positioner 3 is provided with a communication line driving portion 3A, a data processing controlling portion 3B, an electropneumatic converting portion 3C, and an angle sensor (VTD) 3D. The communication line driving portion 3A has an interface 3A1 for communicating data with the controller 1.

The data processing controlling portion 3B has a CPU 3B1 and a memory 3B2, and receives setting value data from the controller 1 through the communication line driving portion 3A, and processes this data to set the driving signal (the control output) IM for the electropneumatic converting portion 3C to IMMIN (the minimum) for an input current I=4 mA from the controller 1, and to set the driving signal IM for the electropneumatic converting portion 3C to IMMAX (the maximum) for an input current I=20 mA, to supply, to the valve 2, an electro-pneumatic converted signal (an air pressure) through the electropneumatic converting portion 3C. The valve 2 is provided with an operating device 2A that receives the electropneumatic converted signal from the positioner 3, and the opening of the valve 2C is controlled through this operating device 2A.

The angle sensor 3D is a sensor for detecting the opening of the valve 2C as a rotational angle position (a lever angle position) of a feedback lever 4 (referencing FIG. 2), and sends the detected lever angle position to the data processing controlling portion 3B. The data processing controlling portion 3B performs feedback control of the opening of the valve 2C based on the lever angle position from the angle sensor 3D. Moreover, the data processing controlling portion 3B sends an electric signal output that depends on the opening of the valve 2C, based on the lever angle position, to the controller 1 through the communication lines L1 and L2 from the communication line driving portion 3A.

Figure 2:
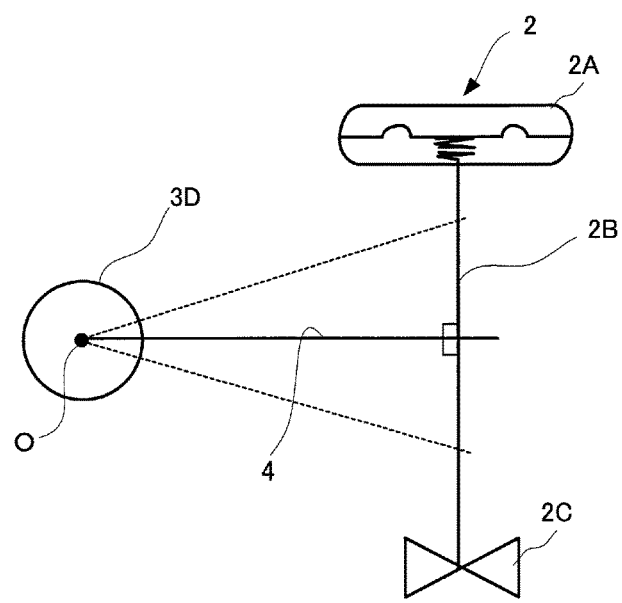
FIG. 2 is a diagram illustrating the relative arrangement of the angle sensor of the positioner and the regulator valve (the valve) in this regulator valve controlling system.

FIG. 2 is a diagram illustrating the relative arrangement of the angle sensor 3D of the positioner 3 and the valve 2. The valve 2 is provided with the operating device 2A, a valve stem 2B, and the valve 2C. The operating device 2A has a diaphragm, where the valve stem 2B moves up or down depending on the air pressure that is applied from the electropneumatic converting portion 3C, to adjust the opening of the valve 2C.

A feedback lever 4 is connected between the angle sensor 3D and the valve stem 2B, in order to detect the lift position of the valve stem 2B, that is, the opening of the valve 2C. The feedback lever 4 rotates around a center O of the angle sensor 3D in accordance with the lift position of the valve stem 2B. The opening of the valve 2C can be known from the rotational angle position (the lever angle position) of this feedback lever 4.

Example

Figure 3:
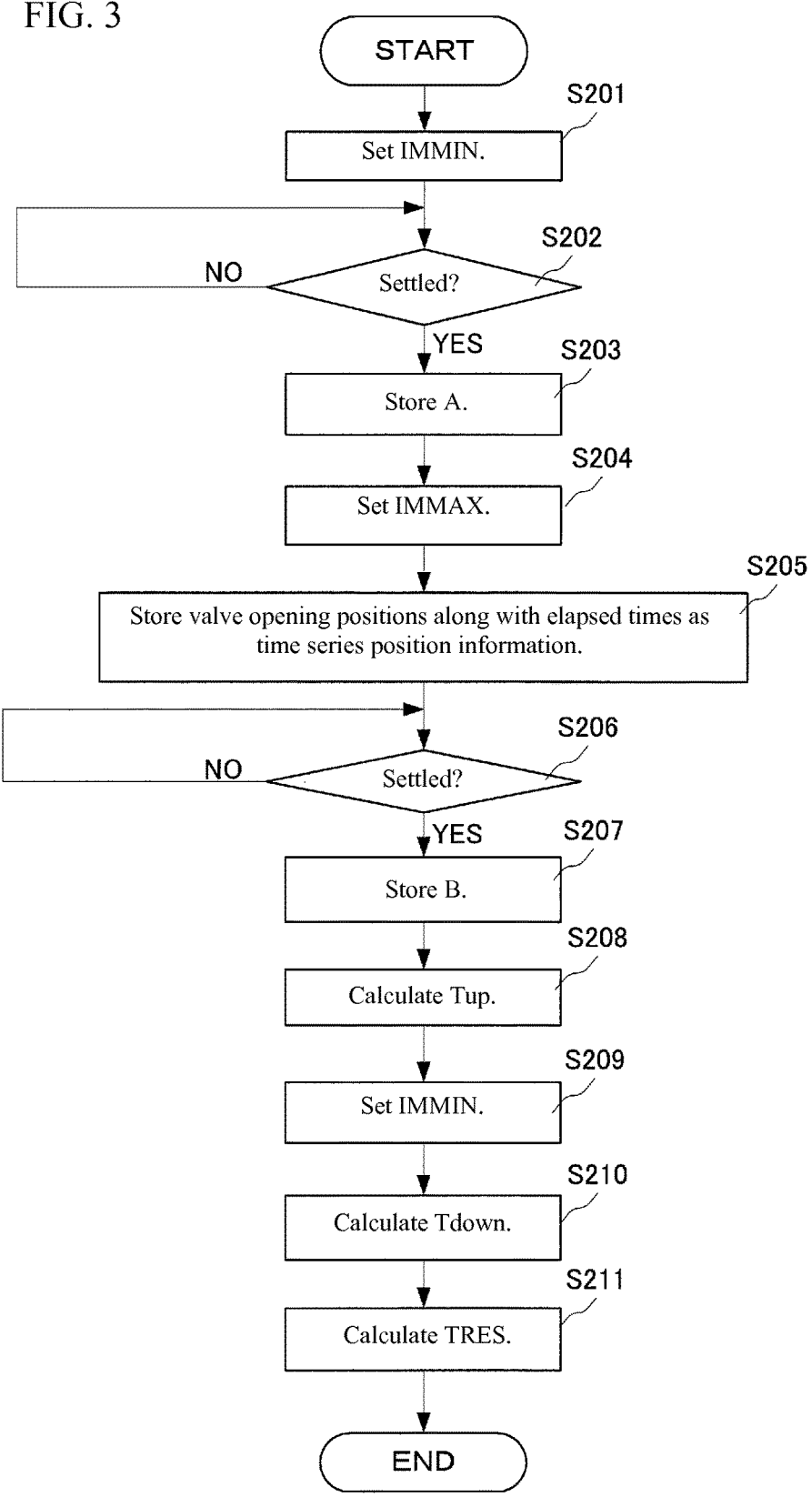
FIG. 3 is a flowchart for explaining Example of the distinctive functions provided in the data processing controlling portion of the positioner in this regulator valve controlling system.

Example of the distinctive functions in the present Description, provided with the data processing controlling portion 3B, will be explained using the flowchart presented in FIG. 3.

Figure 4:
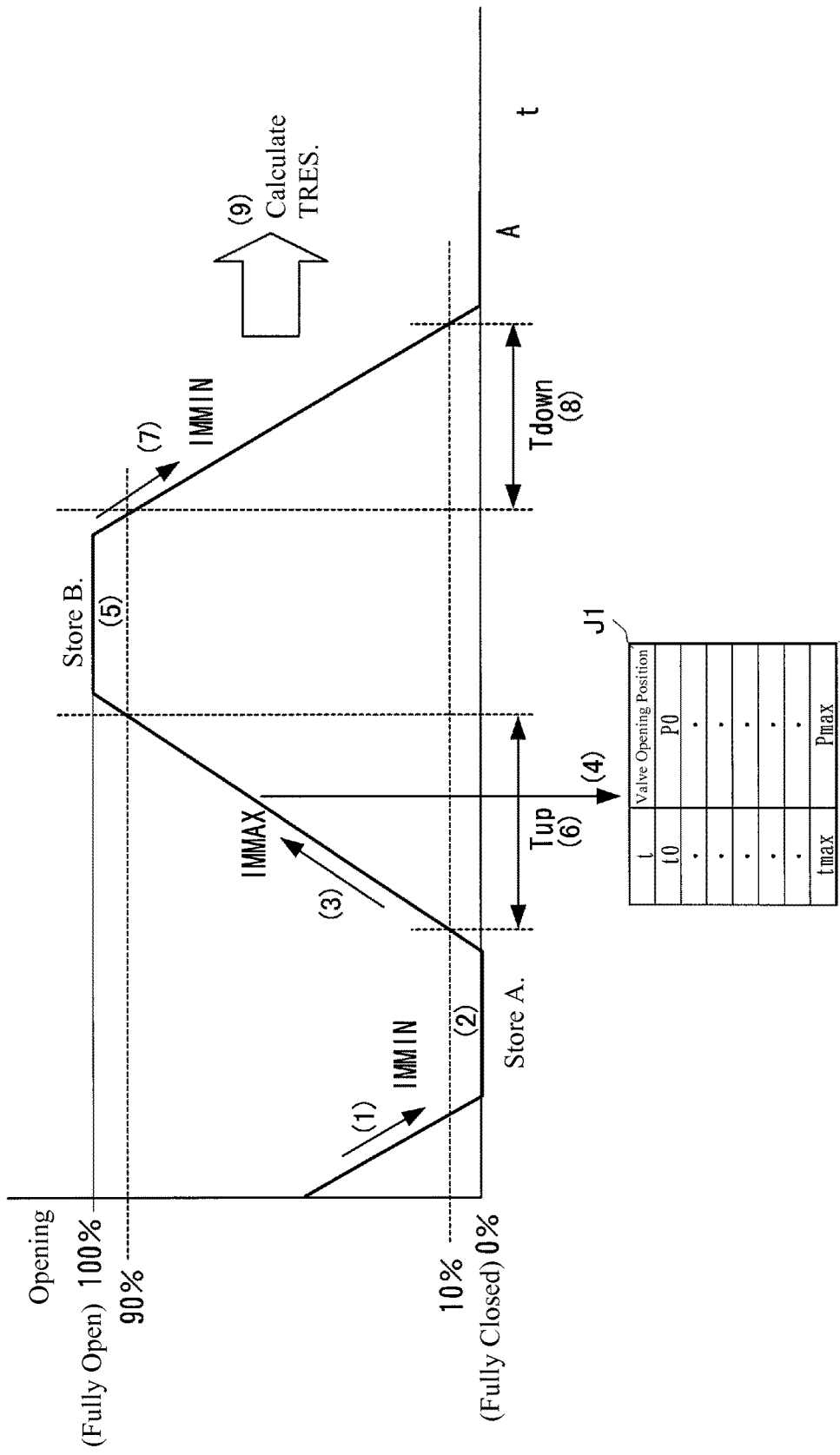
FIG. 4 is a process diagram illustrating the changes in the valve opening positions of the valve, following the flowchart presented in FIG. 3.

The CPU 3B1 of the data processing controlling portion 3B performs tuning of the control parameters during automatic setup. During this tuning of the control parameters, the CPU 3B1 finds the average response time TRES of the valve 2 between the 10% and 90% positions as follows:

(1) The CPU 3B1 sets the driving signal IM to IMMIN (the minimum) (Step S201). This causes the valve 2 to move toward the fully closed position (the 0% position), as illustrated in FIG. 4. Note that while there is also a type wherein the valve 2 moves towards the fully open position (the 100% position) when the driving signal IM is set to IMMIN, the explanation here will be for those that moved toward the fully closed position (the 0% position).

(2) Thereafter, upon detection that the movement of the valve 2 has stopped and settled (YES in Step S202), the CPU 3B1 stores, in the memory 3B2, the valve opening position A at that time (Step S203). (3) Following this, the CPU 3B1 sets the driving signal IM to IMMAX (the maximum) (Step S204). Doing this causes the valve 2 to move toward the fully open position (a full opening operation).

(4) Immediately after setting the driving signal IM to IMMAX, the CPU 3B1 stores, into the memory 3B2, the valve opening position P of the valve 2, together with the elapsed time t, as time series position information J1 (Step S205). (5) Thereafter, upon detection that the movement of the valve 2 has stopped and settled (YES in Step S206), the CPU 3B1 stores, in the memory 3B2, the valve opening position B at that time (Step S207).

(6) Moreover, based on the time series position information J1 that is stored in the memory 3B2, that is, based on the valve opening positions that are stored relative to the elapsed time required for the opening of the valve 2 to arrive at the valve opening position B from the valve opening position A, the CPU 3B1 calculates, and stores in the memory 3B2 as the first response time Tup, the time required for the opening of the valve 2 to arrive at the 90% position, from the 10% position, for the interval between valve opening positions A and B (Step S208).

(7) Following this, the CPU 3B1 sets the driving signal IM to IMMIN (Step S209). This causes the valve to move to the valve opening position A from the valve opening position B (a full closing operation). (8) During this interval, the CPU 3B1 monitors the valve opening position and measures the time, to measure, and store into the memory 3B2 as a second response time Tdown, the time required for the opening of the valve 2 to arrive at the 10% position from the 90% position for the interval between valve opening positions A and B (Step S210).

(9) Following this, the CPU 3B1 averages the first response time Tup, found in Step S208, and the second response time Tdown, measured in Step S210, to calculate the average response time TRES (where TRES=(Tdown+Tup)/2) between the 10% position and the 90% position for the valve 2 (Step S211).

Another Example

Figure 5:
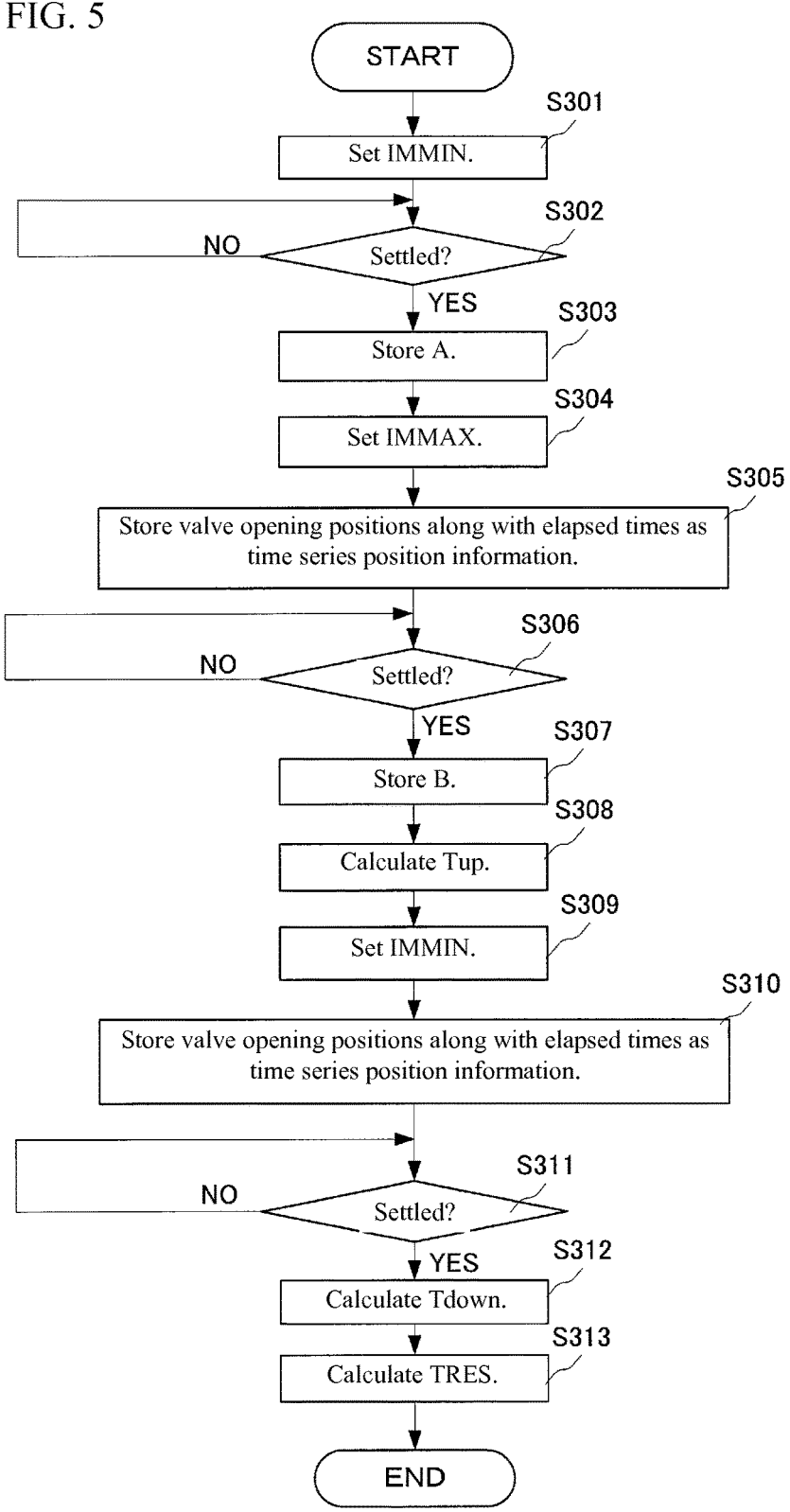
FIG. 5 is a flowchart for explaining Another Example of the distinctive functions provided in the data processing controlling portion of the positioner in this regulator valve controlling system.

Another Example of the distinctive functions in the present Description, provided with the data processing controlling portion 3B, will be explained using the flowchart presented in FIG. 5.

Figure 6:
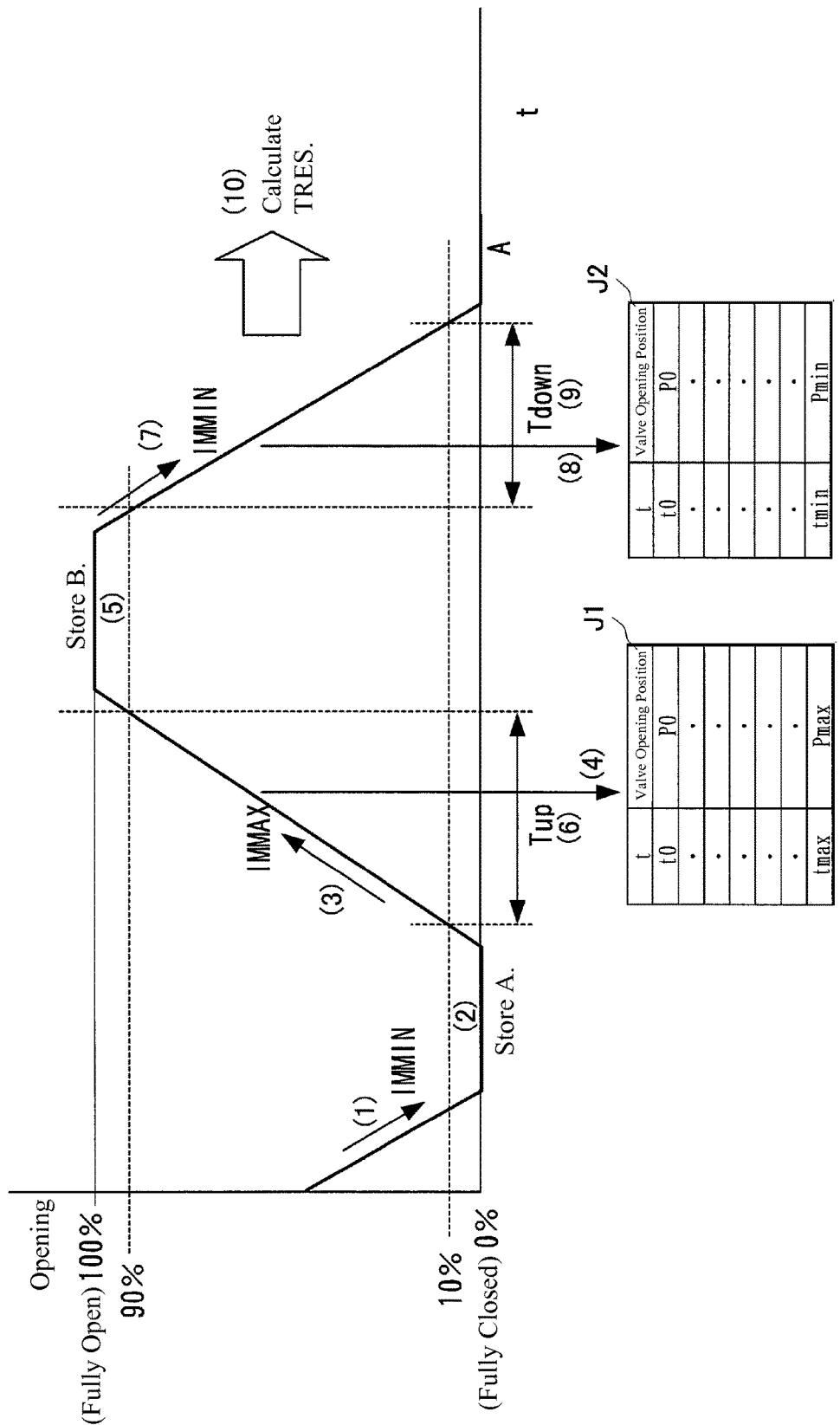
FIG. 6 is a process diagram illustrating the changes in the valve opening positions of the valve, following the flowchart presented in FIG. 5.

During this tuning of the control parameters during the automatic set up, the CPU 3B1 of the data processing controlling portion 3B finds the average response time TRES of the valve 2 between the 10% and 90% positions as follows:

(1) The CPU 3B1 sets the driving signal IM to IMMIN (the minimum) (Step S301). This causes the valve 2 to move toward the fully closed position (the 0% position), as illustrated in FIG. 6. Note that while there is also a type wherein the valve 2 moves towards the fully open position (the 100% position) when the driving signal IM is set to IMMIN, the explanation here will be for those that moved toward the fully closed position (the 0% position).

(2) Thereafter, upon detection that the movement of the valve 2 has stopped and settled (YES in Step S302), the CPU 3B1 stores, in the memory 3B2, the valve opening position A at that time (Step S303). (3) Following this, the CPU 3B1 sets the driving signal IM to IMMAX (the maximum) (Step S304). Doing this causes the valve 2 to move toward the fully open position (a full opening operation).

(4) Immediately after setting the driving signal IM to IMMAX, the CPU 3B1 stores, into the memory 3B2, the valve opening position P of the valve 2, together with the elapsed time t, as time series position information J1 (Step S305). (5) Thereafter, upon detection that the movement of the valve 2 has stopped and settled (YES in Step S306), the CPU 3B1 stores, in the memory 3B2, the valve opening position B at that time (Step S307).

(6) Moreover, based on the time series position information J1 that is stored in the memory 3B2, that is, based on the valve opening positions that are stored relative to the elapsed time required for the opening of the valve 2 to arrive at the valve opening position B from the valve opening position A, the CPU 3B1 calculates, and stores in the memory 3B2 as the first response time Tup, the time required for the opening of the valve 2 to arrive at the 90% position, from the 10% position, for the interval between valve opening positions A and B (Step S308).

(7) Following this, the CPU 3B1 sets the driving signal IM to IMMIN (Step S309). This causes the valve to move to the valve opening position A from the valve opening position B (a full closing operation). (8) Immediately after setting the driving signal IM to IMMIN, the CPU 3B1 stores, into the memory 3B2, the valve opening position P of the valve 2, together with the elapsed time t, as time series position information J2 (Step S310).

(9) Moreover thereafter, once it has been detected that the valve 2 has stopped and settled (YES in Step S311), then, based on the time series position information J2 that is stored in the memory 3B2, that is, based on the valve opening positions that are stored relative to the elapsed time required for the opening of the valve 2 to arrive at the valve opening position A from the valve opening position B, the CPU 3B1 finds, and stores in the memory 3B2 as the second response time Tdown, the time required for the opening of the valve 2 to arrive at the 10% position, from the 90% position, for the interval between valve opening positions A and B (Step S312).

(10) Following this, the CPU 3B1 averages the first response time Tup, found in Step S308, and the second response time Tdown, found in Step S312, to calculate the average response time TRES (where TRES=(Tup+Tdown)/2) between the 10% position and the 90% position for the valve 2 (Step S313).

The CPU 3B1 finds the average response time TRES in this way, and determines the size of the operating device 2A from the average response time TRES that has been found, to determine the control parameters from the size of the operating device 2A that has been found and from the hysteresis level of the operating device 2A.

As can be understood from the explanation above, in both the Example and the Another Example, described above, the first full stroke operation cycle is utilized effectively in finding the first response time Tup, enabling the average response time TRES to be calculated using two full stroke operation cycles. This enables a reduction in the time required for finding the average response time TRES, thereby enabling a reduction in the time required for the automatic setup.

Note that although procedures for comparing large volumes of data were required in order to find the first response time Tup in the Example and in order to find the first response time Tup and the second response time Tdown in the Another Example, when compared to the time required by the full stroke operation, it is small enough to be negligible.

Figure 7:
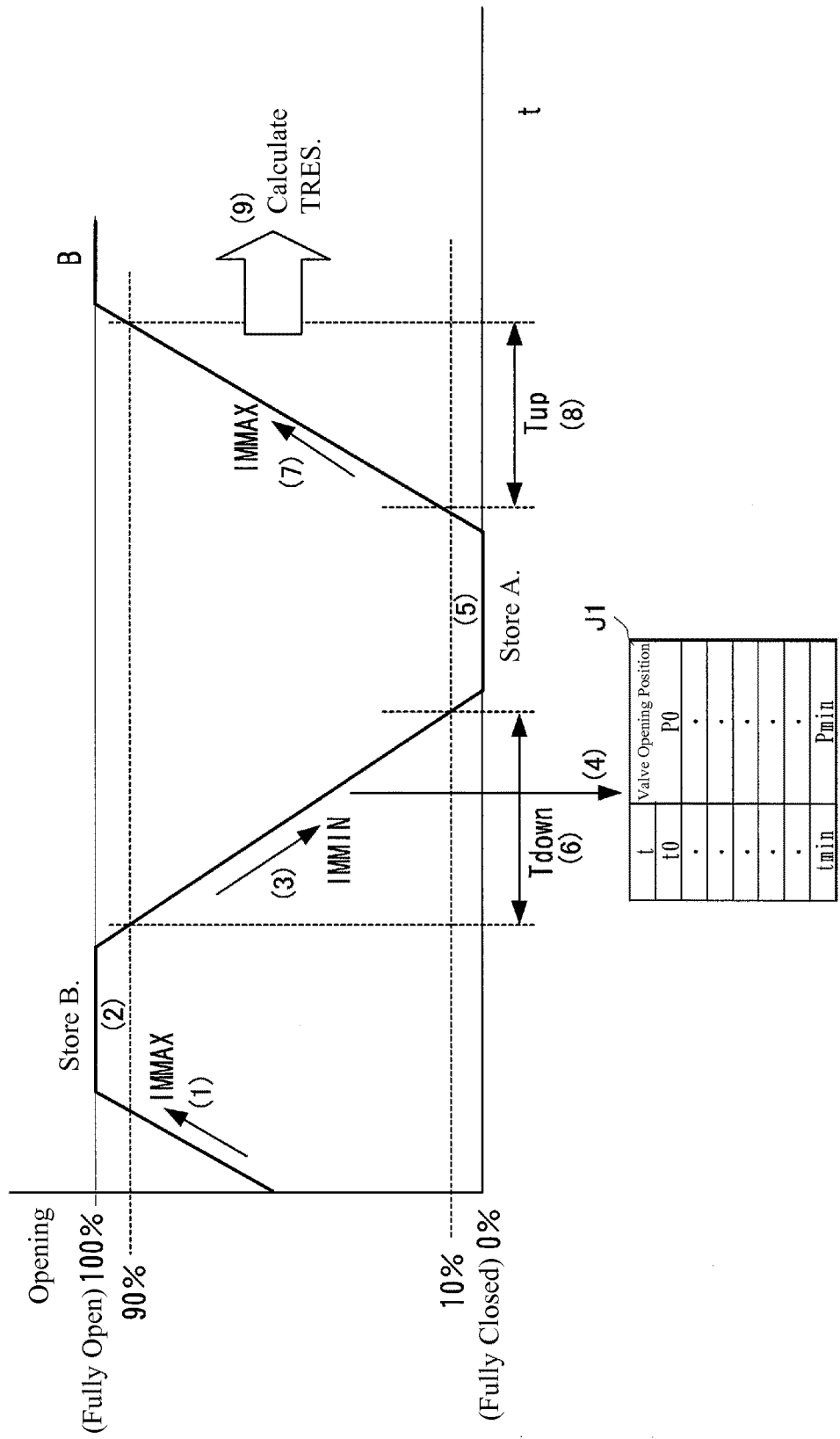
FIG. 7 is a diagram corresponding to FIG. 4, for the case wherein the driving signal IM, in Step (1) in the Example is set to IMMAX.
Figure 8:
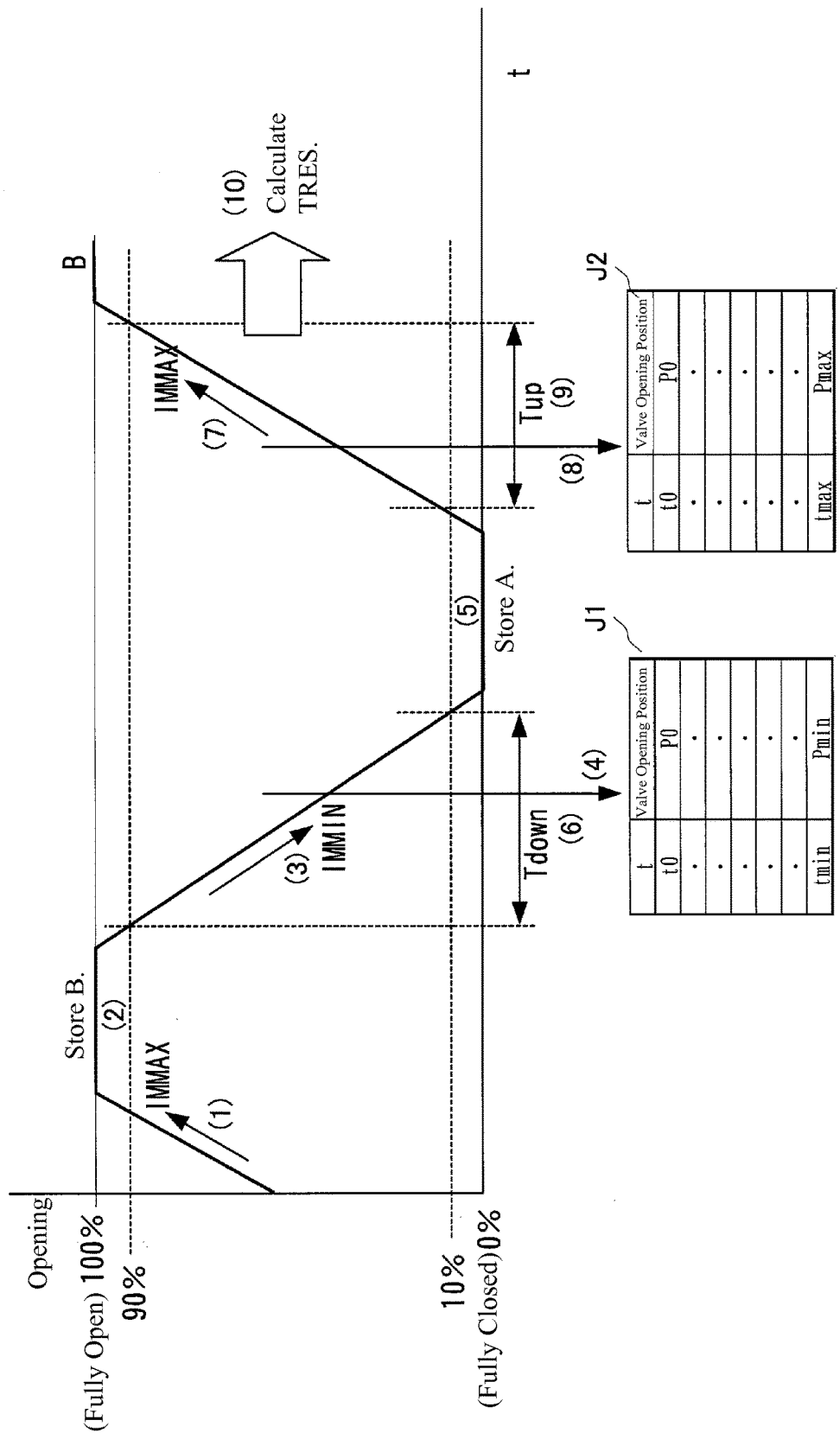
FIG. 8 is a diagram corresponding to FIG. 6, for the case wherein the driving signal IM, in Step (1) in the Another Example is set to IMMAX.
Figure 9:
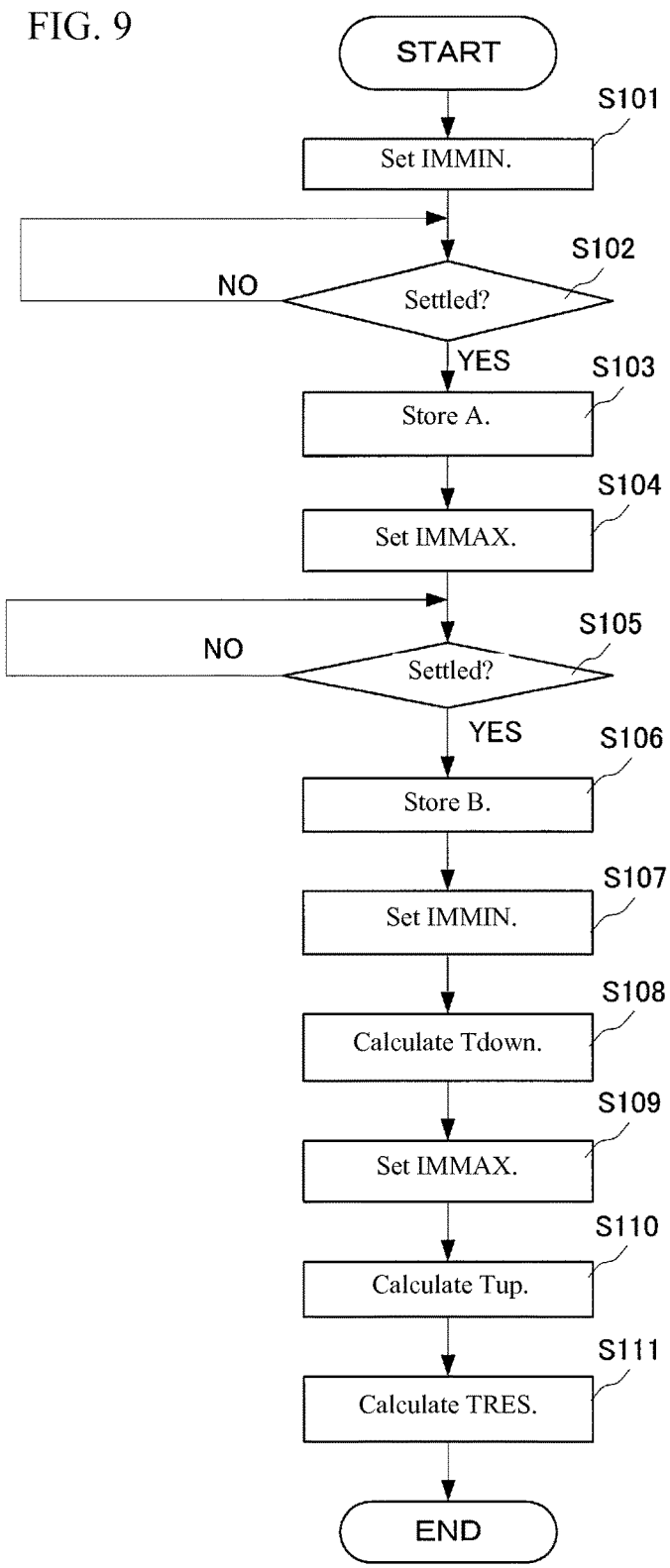
FIG. 9 is a flowchart illustrating a conventional process for calculating the average response time TRES.
Figure 10:
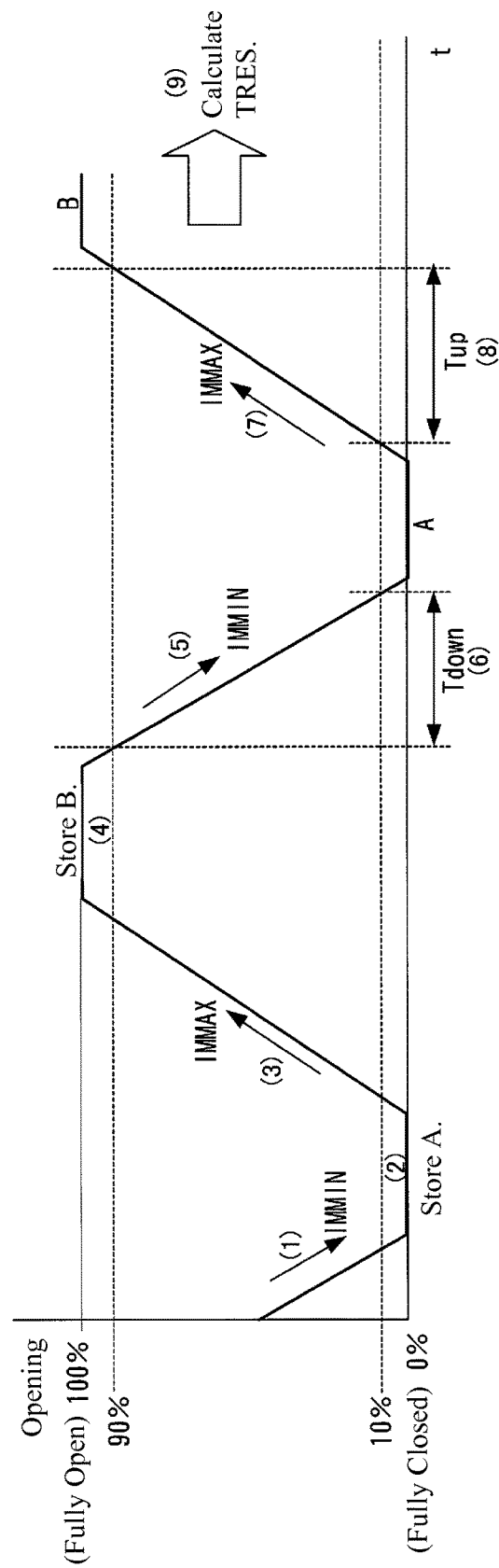
FIG. 10 is a process diagram illustrating the changes in the valve opening positions of the valve, following the flowchart presented in FIG. 9.
Figure 11:
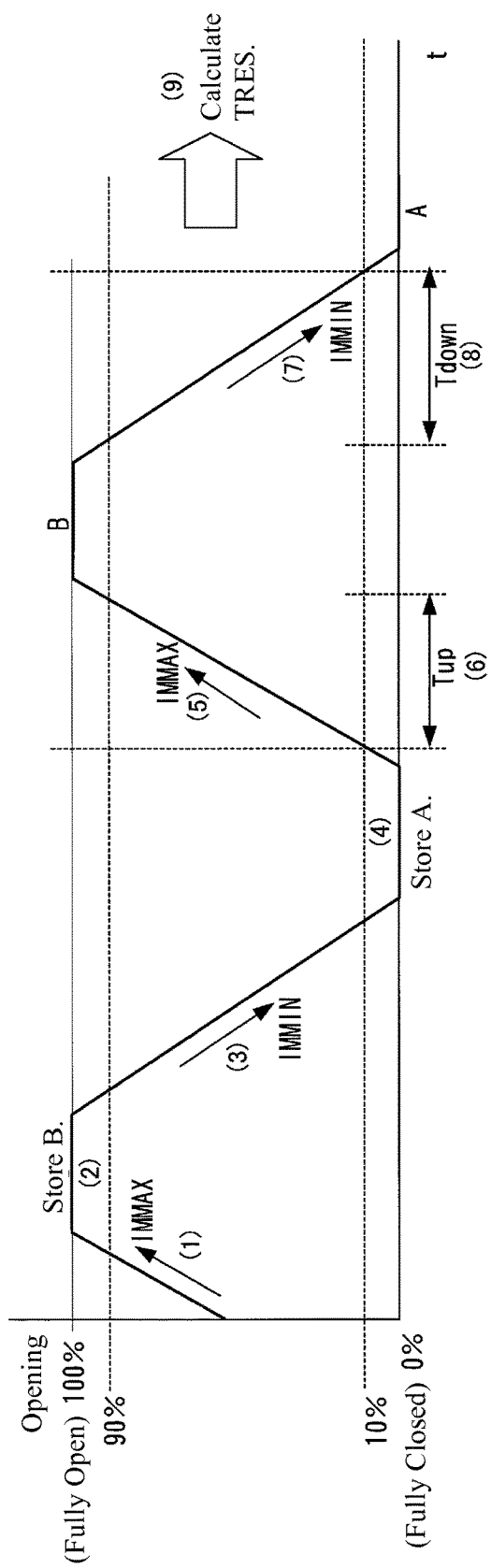
FIG. 11 is a diagram corresponding to FIG. 10, for the case wherein the driving signal IM, in conventional Step (1) is set to IMMAX.

Moreover, while the explanations were for the case wherein the driving signal IM was set to IMMIN in Step (1) in both the Example and the Another Example, described above, the driving signal IM may be set to IMMAX instead in Step (1). The diagram corresponding to FIG. 4, for the case wherein the driving signal IM was set to IMMAX in Step (1) in the Example is given in FIG. 7, and the diagram corresponding to FIG. 6 for the case wherein the driving signal IM was set to IMMAX in Step (1) of the Another Example is given in FIG. 8.

Moreover, while in the Example and the Another Example, set forth above, the first response time Tup was calculated as the time required for the opening of the valve 2 to arrive at the 90% position from the 10% position of the interval between valve opening positions A and B, and the second response time Tdown was calculated as the time required for the opening of the valve 2 to arrive at the 10% position from the 90% position for the interval between valve opening positions A and B, there is no limitation to this necessarily being the interval between the 10% position and the 90% position.

For example, instead the first response time Tup may be calculated as the time required for the opening of the valve 2 to arrive at the 90% position from the 0% position for the interval between valve opening positions A and B, and the second response time Tdown may be calculated as the time required for the opening of the valve 2 to arrive at the 10% position from the 100% position for the interval between the valve opening positions A and B, and the average thereof may be calculated as the average response time TRES.

Moreover, while in the Example and the Another Example, described above, the explanations were for the valve 2 moving toward the fully closed position (the 0% position) when the driving signal IM was set to IMMIN, this can be applied identically, of course, when the movement is toward the fully open position (the 100% position).

Moreover, while in the Example and the Another Example, above, the average response time TRES was calculated as the average of the first response time Tup and the second response time Tdown, if an operating device 2A wherein there is no difference in the speed in the direction wherein the valve opening is increased and the direction wherein the valve opening is decreased is used, then the first response time Tup may be calculated alone and this first response time Tup may be used as the average response time TRES. In this case, the average response time TRES may be found with a single full stroke operation cycle, enabling a further reduction in the time required for the automatic setup.

Extended Examples

While the present invention has been explained above in reference to examples, the present invention is not limited to the examples set forth above. The structures and details in the present invention may be varied in a variety of ways, as can be understood by one skilled in the art, within the scope of technology in the present disclosure.

The invention claimed is:

1. A positioner having an electropneumatic converting portion for converting an inputted electric signal to an air pressure, to apply the converted air pressure to an operating device of a regulator valve, to control a valve opening of the regulator valve through the operating device, the positioner comprising:
   a first valve opening position storing portion that stores, as a first valve opening position, a valve opening position for when an input electric signal has been set so that a driving signal, which when converted into an air pressure, is set to one of a minimum signal and a maximum signal, and the regulator valve has then settled;
   a first time series position information storing portion that stores, as a second valve opening position, a valve opening position for when the input electric signal has been set so that the driving signal, which when converted into an air pressure, is set to another of the minimum signal and the maximum signal that is different from the one set for the first valve opening position, and the regulator valve has then settled, and stores, as time series position information, the valve opening positions, along with elapsed times, up until the valve opening of the regulator valve arrives at the second valve opening position from the first valve opening position; and
   a first response time calculating portion that calculates, as a first response time, the time over which the valve opening of the regulator valve passes between two prescribed valve opening positions, established in an interval between the first valve opening position and the second valve opening position, based on the time series position information stored by the first time series position information storing portion.

2. The positioner as set forth in claim 1, further comprising:
   a second response time measuring portion that sets the driving signal to the one of the minimum signal and the maximum signal, after storing of the second valve opening position, and measures, as a second response time, the time required thereafter for the valve opening of the regulator valve to arrive at a prescribed valve opening position, set on the first valve opening position side, in the interval between the first valve opening position and the second valve opening position; and
   an average response time calculating portion that calculates, as an average response time, an average of the first response time, calculated by the first response time calculating portion, and the second response time, measured by the second response time measuring portion.

3. The positioner as set forth in claim 1, further comprising:
   a second time series position information storing portion that stores, as time series position information when the driving signal is set to the one of the minimum signal and the maximum signal, the valve opening positions, along with the elapsed times, up until the valve opening of the regulator valve arrives at the first valve opening position from the second valve opening position;
   a second response time calculating portion that calculates, as a second response time, the time over which the valve opening of the regulator valve passes between two prescribed valve opening positions, established in an interval between the first valve opening position and the second valve opening position, based on the time series position information stored by the second time series position information storing portion; and
   an average response time calculating portion that calculates, as an average response time, an average of the first response time, found by the first response time calculating portion, and the second response time, calculated by the second response time calculating portion.

4. A method for calculating an average response time of a positioner having an electropneumatic converting portion for converting an input driving signal to an air pressure, to apply the converted air pressure to an operating device of a regulator valve, to control a valve opening of the regulator valve through the operating device, the method comprising:
   setting the driving signal to be converted into an air pressure to one of a minimum signal and a maximum signal;
   storing, as a first valve opening position, a valve opening position after the regulator valve has been settled;
   setting the driving signal to be converted into an air pressure to another of the minimum signal and the maximum signal that is different from the one for the first valve opening position;
   storing, as a time series position information, the valve opening positions along with elapsed times, up until the valve opening of the regulator valve arrives at the second valve opening position from the first valve opening position;
   storing, as a second valve opening position, a valve opening position after the regulator valve has been settled;
   calculating, based on the time series position information stored, as a first response time a time the regulator valve passed between two prescribed valve opening positions within an interval between the first valve opening position and the second valve opening position; and
   calculating, based on the first response time, the average response time.

5. The method of claim 4, further comprising:
   setting, after storing of the second valve opening position, the driving signal to the one of the minimum signal and the maximum signal; and
   measuring, as a second response time, a time the regulator valve requires thereafter between the two prescribed valve opening positions within the interval between the first valve opening position and the second valve opening position; and
   calculating the average response time as an average of the first response time and the second response time.

6. The method of claim 4, further comprising:
   setting the driving signal to the one of the minimum signal and the maximum signal;
   storing, as a second time series position information, the valve opening positions along with the elapsed times, up until the valve opening of the regulator valve arrives at the first valve opening position from the second valve opening position;
   calculating, based on the second time series position information, as a second response time a time the regulator valve passed between two prescribed valve opening positions within an interval between the first valve opening position and the second valve opening position; and calculating the average response time as an average of the first response time and the second response time.

* * * * *